Oct. 16, 1962 E. D. THOMAS ET AL 3,059,211

ELECTRICAL CONNECTOR FOR FLAT CONDUCTOR CARRIERS

Filed May 24, 1960 2 Sheets-Sheet 1

INVENTORS
E. D. THOMAS
D. J. CRIMMINS
M. C. LOGAN

BY [signature]

ATTORNEY

Oct. 16, 1962 E. D. THOMAS ET AL 3,059,211

ELECTRICAL CONNECTOR FOR FLAT CONDUCTOR CARRIERS

Filed May 24, 1960 2 Sheets-Sheet 2

INVENTORS
E. D. THOMAS
D. J. CRIMMINS
M. C. LOGAN
BY Harry [signature]
ATTORNEY

United States Patent Office 3,059,211

Patented Oct. 16, 1962

3,059,211
ELECTRICAL CONNECTOR FOR FLAT CONDUCTOR CARRIERS

Edward D. Thomas, Westfield, David J. Crimmins, Nutley, and Maurus C. Logan, Elizabeth, N.J., assignors to The Thomas & Betts Co., Elizabeth, N.J., a corporation of New Jersey Filed May 24, 1960, Ser. No. 31,423
7 Claims. (Cl. 339—126)

Figure 1:
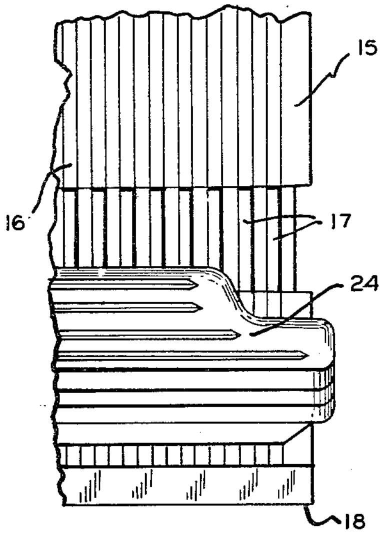

The invention is directed to a precision device for accurate connection of flat conductor carriers to other electrical elements, circuits, conductors or parts thereof. Flat conductor carriers may be readily attached to the novel device of this invention and moved into sliding contact with other elements to be connected therewith, positively holding the same engaged and in electrical contact, while enabling the ready separation and electrical disconnection of the parts at any time for replacement, repair or other selective action when desired.

The drawings, illustrating procedures and devices useful in carrying out the invention, and the description below, are exemplary only of the invention, which shall be deemed to cover all other devices and procedures coming within the scope and purview of the appended claims.

Figure 2:
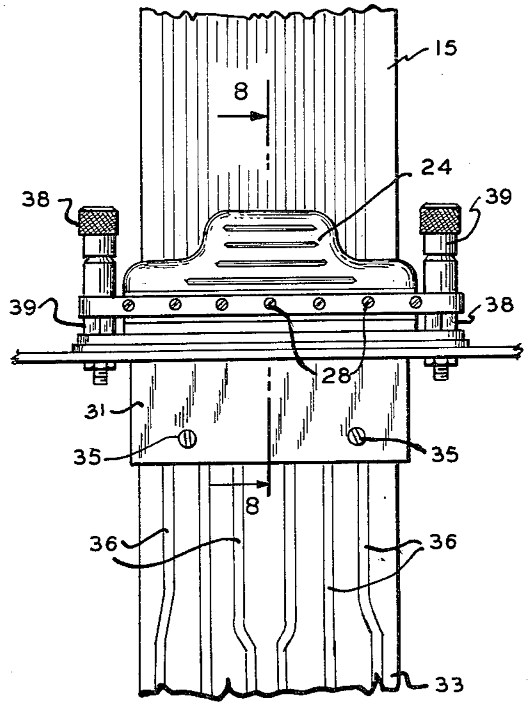
Figure 3:
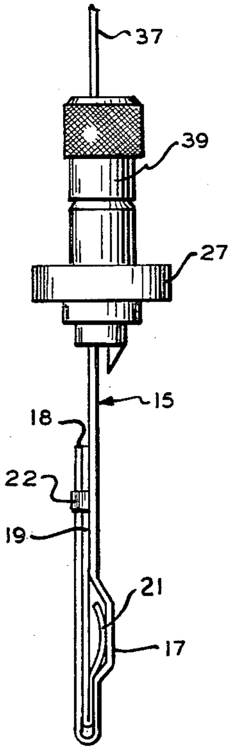
Figure 4:
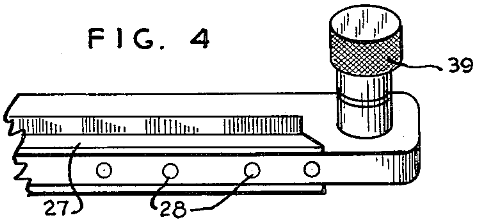
Figure 5:
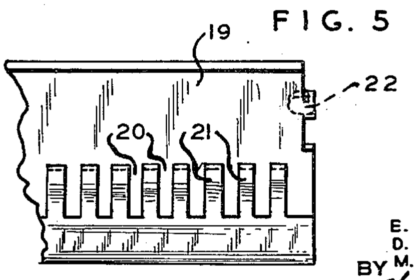
Figure 6:
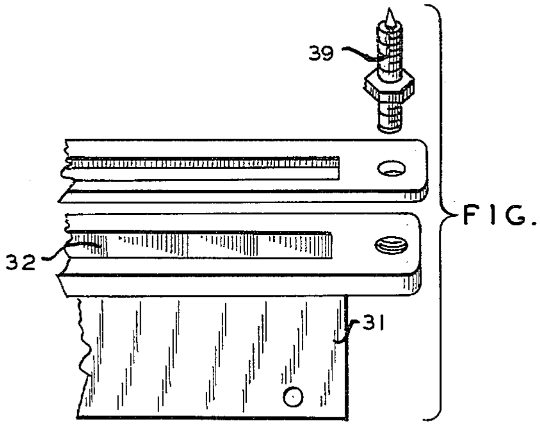
Figure 7:
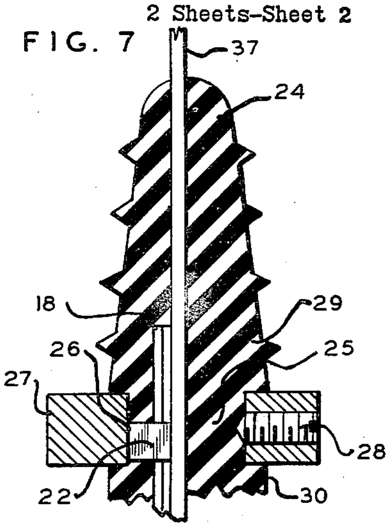
Figures 8, 9, 10:
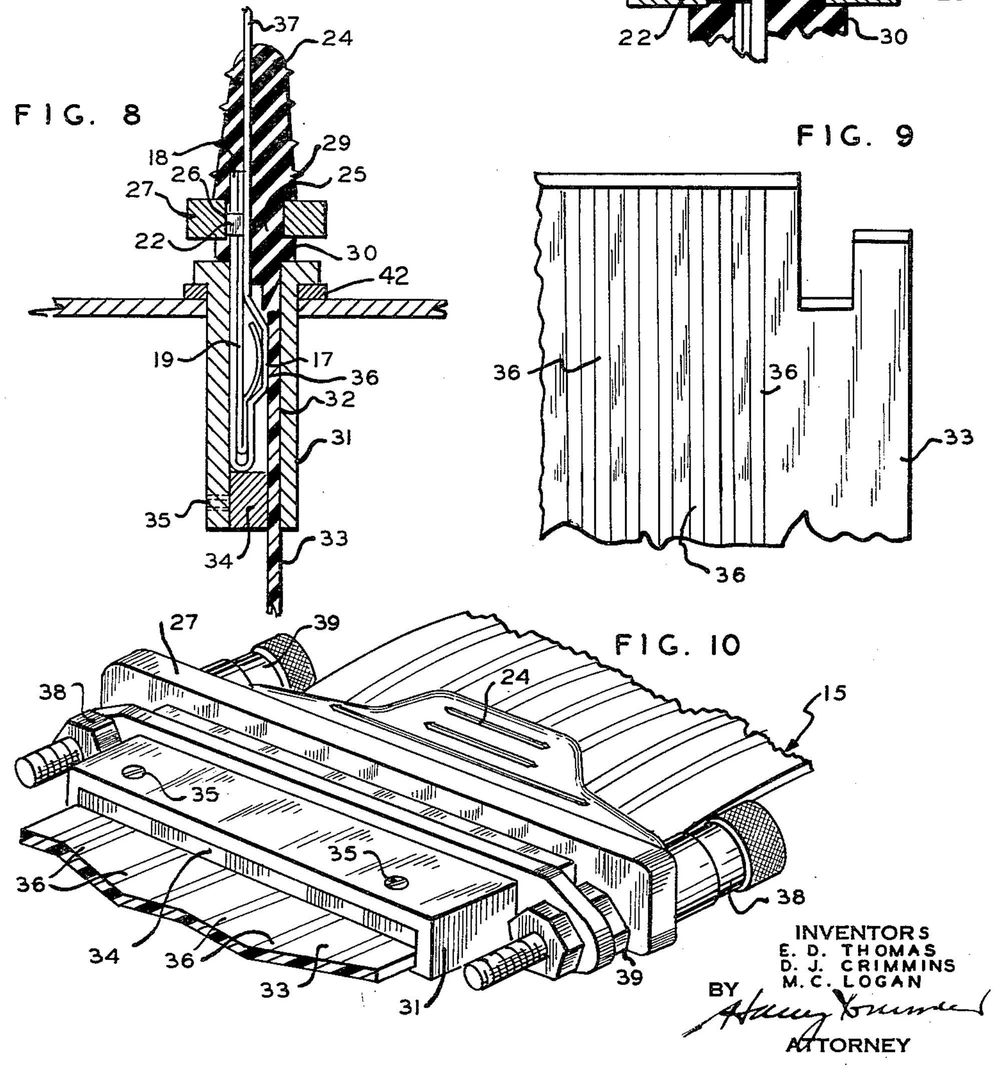

In the drawings, wherein similar reference characters indicate like parts:

FIG. 1 is a fragmentary, plan view of a flat electrical conductor carrier positioned in a flexible grommet, prior to assembly of the parts to the position shown in FIG. 8, FIG. 2 is an elevational view showing said flat conductor carrier connected to a second conductor carrier in a casing pursuant to the invention, FIG. 3 is an end elevational view showing the flat conductor carrier assembled on and encircling spring 19 after first stripping the insulation from and baring the conductor ribbons 17, prior to moving the flexible grommet 24 downwardly onto the same as shown in FIG. 8, FIG. 4 is a perspective view of a form of frame plate which may be used in carrying out the invention, FIG. 5 is a perspective view of a spring member around which the free end of the flat electrical conductor carrier may be wrapped pursuant to the invention, FIG. 6 is an exploded, perspective view of parts of the invention which may define a casing, FIG. 7 is an enlarged, vertical sectional view, taken partly at line 8—8 of FIG. 2, FIG. 8 is a vertical sectional view taken at line 8—8 of FIG. 2, FIG. 9 is a fragmentary perspective view of one form of second conductor to which a flat electrical conductor carrier my be secured, FIG. 10 is a fragmentary perspective view of a device embodying the invention, shown effecting such connections.

As shown in the drawings, the invention is especially useful for connection of a flat conductor carrier 15 such as a flexible strip of plastic or other dielectric material 16 enclosing conductor ribbons 17 (FIG. 1). The free end 18 of the flat electric conductor carrier 15 is wrapped around a spring plate 19 which may (FIG. 5) be provided with a plurality of slits 20 defining a plurality of fingers 21 bowed away from the plate 19 and aligned with the conductors 17 which are thus urged outwardly (FIG. 3) said spring having reentrantly bent end ears 22 at the ends thereof (FIG. 5) through which the free end 18 of the first electric conductor carrier 16 is inserted on assembly of the parts (FIG. 8). The insulation 15 is first stripped from the conductor ribbons 17 (as in FIG. 1) so that, on assembly of the parts (FIG. 2) the second conductor carrier 33, which may be a component mounted on or connected with a plate with suitable wires printed or otherwise formed thereon, as noted at 36, may be readily connected with the first conductor carrier 16 and thus substitution of components and connectors may be readily effected from time to time as required.

The flexible grommet 24 is moved down onto the (FIG. 3) assembly of the first conductor carrier 15 on the spring plate 19 and the grommet 24 is held within the frame plate 27 either by frictionally fitting therein or by other means such as indicated at 28 in FIG. 7. The frame plate 27 may (FIG. 7) be provided with means such as threaded pins 28 (FIGS. 2 and 7) for further compressing the flexible grommet 24 in the frame plate 27, if desired. The flexible grommet 24 may be provided with projections 29, 30 marginally adjacent the medial portion 25 and overlapping the frame plate 27 (FIGS. 7 and 8). A casing 31 is provided (FIGS. 2 and 6) with a recess 32 of greater width than the second electric conductor carrier 33 to be inserted into said casing recess and with means such as spacer 34 (FIG. 8) which may be tightly held in the casing 31 as by screw 35 bearing thereagainst (FIG. 8). The second electric conductor carrier 33 is positioned in the casing with the conducting face or portion 36 thereof directed toward bared portions of the first electric conductor carrier 15 (FIG. 7) whose opposite end 37 (FIG. 3) extends out of the flexible grommet 24 for connection with any desired electrical components. Similarly, the second electric conductor carrier 33 may (FIG. 8) extend out of the casing 31. Means may be provided for holding the frame plate 27 in position on the casing and for securing positive contact of the first and second electric conductor carriers as above noted such as male and female elements 38, 39 (FIG. 2) one of which may be a threaded pin and the other a complementarily internally threaded cap to engage the pin and thereby draw the parts together. Likewise one of the parts 39, 38 may be secured to the frame plate 27 and the other to the casing 31. Preferably the parts are secured to the ends of the casing and frame plate in an alternate arrangement (FIG. 2) such as to provide a polarizing or registration effect to assure insertion of the first electric conductor carrier 15 in the casing facing the right direction for sliding the bared portion of conductor carrier 15 into contact with the conducting portion 36 of the second electric conductor carrier 33. It will be noted from the foregoing that means are provided for readily inserting a first electric conductor carrier 15 and its associated connector parts (FIG. 8) in a casing 31 containing a second electric conductor carrier 33 with which the first electric conductor carrier 15 has positive sliding contact on insertion. The parts may be locked in that position by means such as members 38, 39 above mentioned and may be readily disengaged to break the connection at any desired time; likewise various second electric conductor carrier elements 33 may be readily substituted and replaced from time to time for electric connection therein with the first electric conductor carrier 15 in a rapid and effective manner.

Having thus described our invention, what we claim as new and desire to secure by Letters Patent is:

1. A device for connection of a first group of electrical conductors carried by a first flat electrical conductor carrier with a second group of electrical conductors carried by a second conductor carrier in a recess of a casing secured to a supporting surface, comprising a rigid rectangular frame plate having an aperture therethrough, a flexible grommet proportioned to be compressibly received in the plate aperture and to extend therefrom and to thus dispose the grommet therein against accidental displacement, said grommet having an aperture to receive said first conductor carrier and to thereby hold the same securely in the plate and extended beyond the plate, a casing having a recess of greater width than the said second conductor carrier, said frame plate being adapted to be connected to the casing so that said first flat electrical conductor carrier may thus be inserted into said recess, resilient means in said casing to urge a bared portion of said first group of electrical conductors against the second group of electrical conductors, connecting the same electrically.

2. A device as defined in claim 1 and further including cooperating means on each of said frame and casing for securing the two together in assembled relation.

3. In a device as set forth in claim 1, a spacer in said casing frictionally holding the second electrical conductor carrier therein.

4. In a device as set forth in claim 1, said flexible grommet having a medial portion so proportioned to be so compressibly received in the plate aperture and projections on said grommet disposed adjacent said medial portion and extending therebeyond overlapping the plate and resisting accidental displacement of the grommet from the plate aperture.

5. In a device as set forth in claim 1, the resilient means comprising a spring inserted into the flexible grommet and the first flat conductor carrier extending over the spring for frictionally pressing the first group of electrical conductors against the second group of electrical conductors.

6. In a device as set forth in claim 5, said spring means comprising an elongated flat plate member with a plurality of longitudinal slits defining a plurality of spring fingers to press the bared portion of said first group of electrical conductors against the second group of electrical conductors in the casing.

7. In a device as set forth in claim 5, said spring means comprising an elongated flat plate member with a plurality of longitudinal slits defining a plurality of spring fingers bowed away from the plate, pressing the bared portion of the first group of electrical conductors against the second group of electrical conductors in the casing.

References Cited in the file of this patent

UNITED STATES PATENTS

| | | |
|---|---|---|
| 2,077,587 | Rowe | Apr. 20, 1937 |
| 2,688,735 | Hubbell | Sept. 7, 1954 |
| 2,693,584 | Pifer | Nov. 2, 1954 |
| 2,706,803 | Templeton | Apr. 19, 1955 |
| 2,802,958 | Curley | Aug. 13, 1957 |
| 2,858,515 | Thunander et al. | Oct. 28, 1958 |
| 2,891,103 | Swengel | June 16, 1959 |
| 2,932,810 | Novak | Apr. 12, 1960 |
| 2,971,179 | Heuer | Feb. 7, 1961 |

FOREIGN PATENTS

| | | |
|---|---|---|
| 700,490 | Great Britain | Dec. 2, 1953 |